United States Patent [19]

Papousek

[11] 3,951,391

[45] Apr. 20, 1976

[54] SHOCK ABSORBER

[76] Inventor: Robert D. Papousek, 3426 Chicago, San Diego, Calif. 92117

[22] Filed: Feb. 22, 1974

[21] Appl. No.: 444,788

[52] U.S. Cl. ................................. 267/8 R; 267/34
[51] Int. Cl.² .......................................... B60G 15/16
[58] Field of Search ........................ 267/34, 6, 8 R

[56] References Cited
UNITED STATES PATENTS

| | | | |
|---|---|---|---|
| 3,010,714 | 11/1961 | Stresnak et al. | 267/8 R |
| 3,043,581 | 7/1962 | Schmidt | 267/8 R |
| 3,096,084 | 7/1963 | Osterhoudt | 267/8 R |
| 3,163,411 | 12/1964 | Heckethorn | 267/8 R |
| 3,464,688 | 9/1969 | Papousek | 267/34 |

Primary Examiner—James B. Marbert

[57] ABSTRACT

A shock absorber having an external, helical coiled spring in concentric alignment therewith, one end of said coiled spring being fixed to one end of such shock absorber and the other end of said coiled spring being provided with an internally projecting lug as a part thereof, said other end being secured to said shock absorber by means of a clamping member, said clamping member comprising two sections which when joined, are cylindrical and have a diameter approximately equal to the diameter of said coiled spring, said two parts having a longitudinal interface, said clamping member being provided with a continuous helical groove in the outer surface thereof, said helical groove substantially conforming to the configuration and cross-sectional dimensions of said coiled spring and having an indentation at lower end thereof adapted for receiving said internally projecting lug of said helical coiled spring, said clamping member further having an opening therethrough along its axis of dimensions substantially the same but not less than, the dimensions of said shock absorber at the point to which said clamping member is to attach, said clamping member being further provided with means for joining and holding said two sections thereof in fixed relation to one another and to said shock absorber.

5 Claims, 10 Drawing Figures

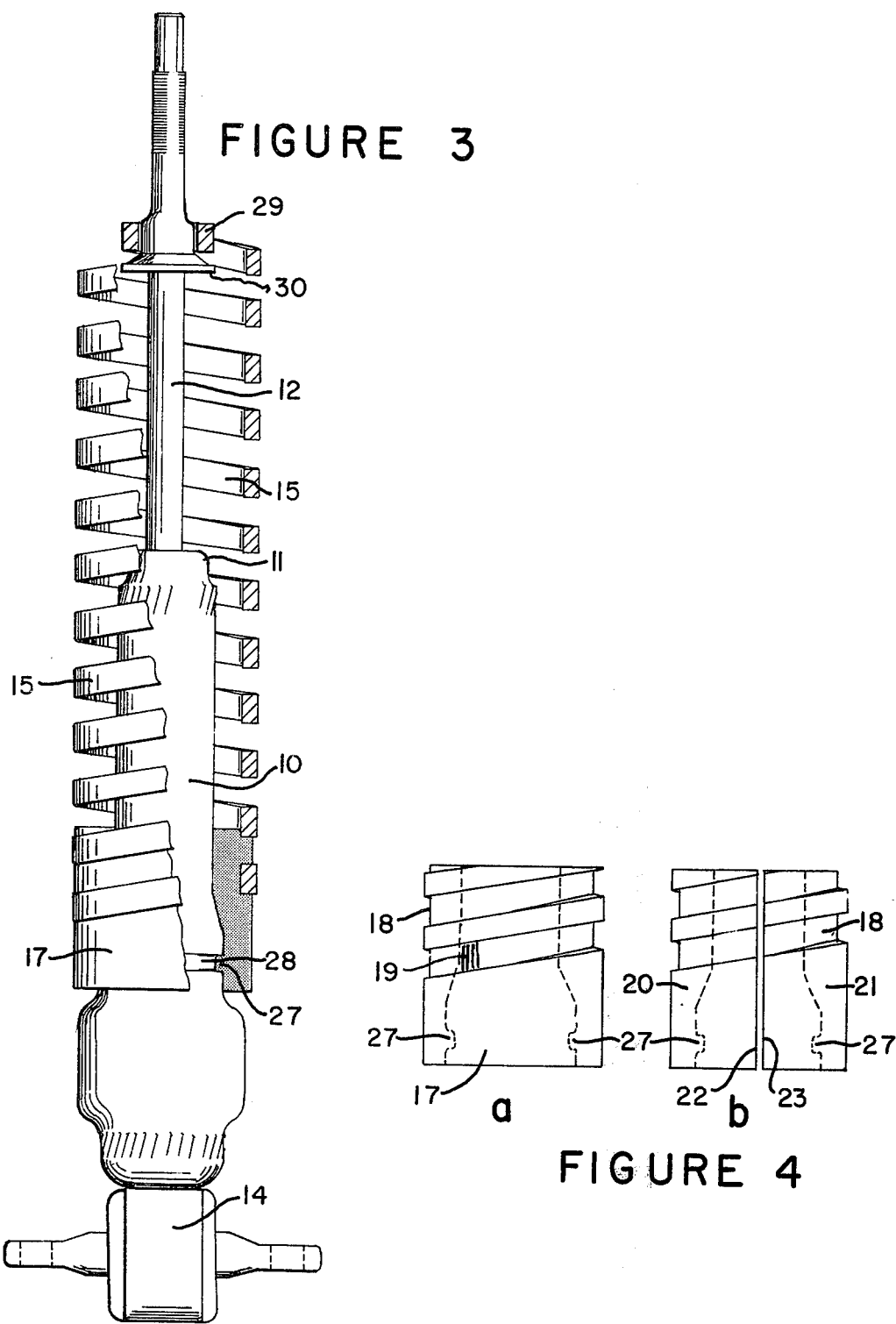

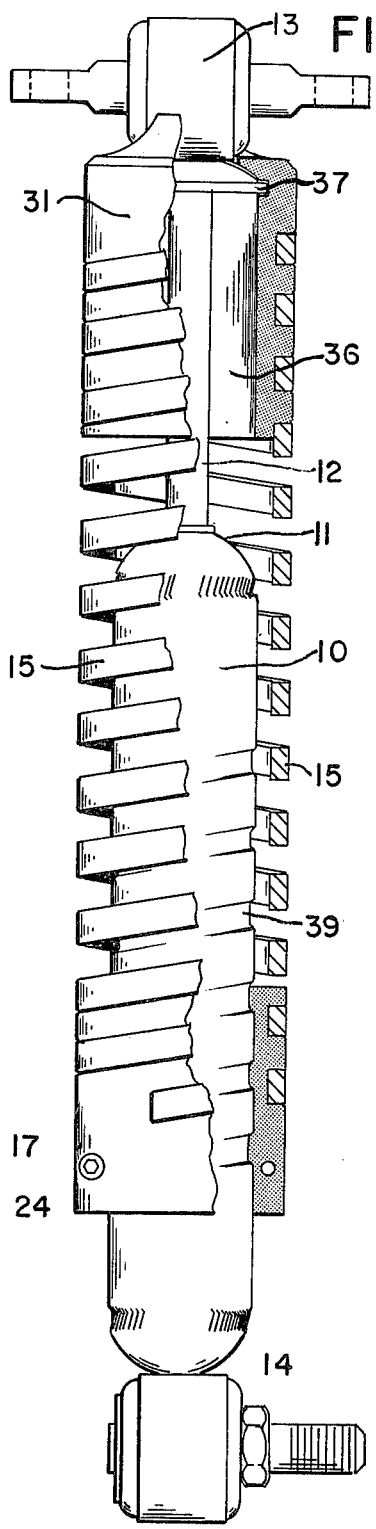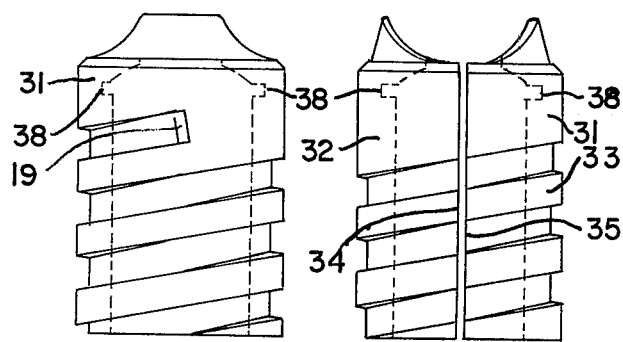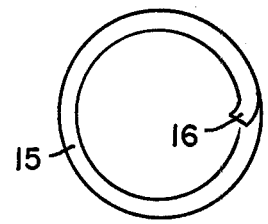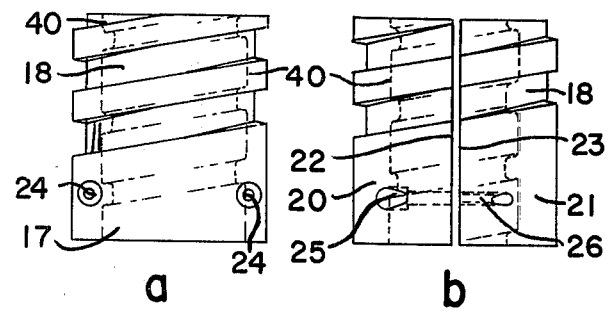
FIGURE 5
FIGURE 6
FIGURE 8
FIGURE 7

SHOCK ABSORBER

BACKGROUND OF THE INVENTION

The present invention relates to new and improved shock absorbers for motor vehicles. More particularly, the present invention relates to a shock absorber useful on either the front or back of motor vehicles and which acts in tension as well as in compression.

Generally, suspension units for motor vehicles include a telescopic hydraulic shock absorber for heavy loads. In circumstances where a vehicle suspension already incorporating telescopic shock absorbers proves unsatisfactory in use because it is too soft for the loaded conditions which it experiences, then combined suspension units are useful in enabling the vehicle suspension to be stiffened or otherwise modified without major structural changes, simply by directly adding a coil spring, sometimes called an overload spring, externally around the shock absorber to act in compression. This is frequently employed on pick-up trucks used for heavy loads or for campers installed on pick-up trucks. Frequently, this so-called overload spring is used on automobiles or station wagons for supporting trailers or heavy loads on the back. In nearly all cases, the compression overload springs are installed on the rear shock absorbers to support the heavy rear load.

The purpose of all automobile or other vehicle suspension systems situated between the wheels of such vehicle and the frame of the automobile or vehicle is to support the vehicle's body and frame upon the wheels and provide the means of absorbing road shock caused by passage of the wheels over irregularities. In general, there are four major types of springs used for such suspension. These are leaf springs, coil springs, torsion bar springs and air or liquid hydraulic springs. The weight of the automobile or other vehicle applies on initial compression to the springs and when the wheels encounter irregularities in the highway or earth surface, the springs further compress to absorb additional shock. The springs may also compress considerably due to heavy loading of the vehicle, or due to banking or leaning of the vehicle during the negotiation of turns or curves at high speed. Shock absorbers are used as noted above, in conjunction with or as a replacement for springs to restrain excessive spring movement and prevent prolonged oscillations, which would afford a generally rougher ride. The most serious problem, however, with all of the various types of suspension systems for vehicles, either as a spring of the type mentioned above or a combination of spring and shock absorber for heavy loads, is that the front, in particular, of the automobile or other vehicle always rides high and has a definite tendency to bounce when passing over highway or other surface irregularities, thereby creating an uncomfortable ride and resulting in poor control of the vehicle.

It has been proposed to provide a coiled spring external to the shock absorber and concentrically aligned therewith. This spring is attached to each end of the shock absorber. The use of such attached coil spring provides for the shock absorber to operate not only in compression but also in tension. However, one of the difficulties encountered in such shock absorbers is the attachment of the coiled spring to the shock absorber. While the ends of the spring may be welded to the ends of the shock absorber or may become in many instances, fixed by other means to ends of the shock absorber at the time of manufacture, there is lacking means for fixing the spring to the shock absorber in a manner which will permit adjustment of the tension or compression of the spring to the needs of the vehicle to which the shock absorber is attached. Further, presently known means for fixing such spring to the shock absorbers do not permit ready addition of the spring to a shock absorber after manufacture of such shock absorber, particularly, when such addition is to be made away from the place of manufacture of the shock absorber and often, by personnel not skilled in such manufacture.

It is an object of the present invention to provide a new and improved suspension system for vehicles.

Another object of the present invention is to provide an improved suspension system for vehicles which operates in tension as well as in compression.

Still another object of the present invention is to provide a new and improved shock absorber which may be used on either the front or the rear of a vehicle and which operates in tension as well as in compression.

A remaining object of the present invention is to provide a new and improved shock absorber having an external coiled spring concentrically aligned therewith.

A particular object of the present invention is to provide a new and improved means for affixing an external coiled spring to a shock absorber body with which it is concentrically aligned.

Additional objects will become apparent from the following description of the invention herein disclosed.

SUMMARY OF THE INVENTION

In fulfillment of these and other objects, the present invention, in one of its embodiments, is a shock absorber having an external, helical coiled spring in concentric alignment therewith, one end of said coiled spring being fixed to one end of such shock absorber and the other end of said coiled spring being provided with an internally projecting lug as a part thereof, said other end being secured to said shock absorber by means of a clamping member, said clamping member comprising two sections which when joined, are cylindrical and have a diameter approximately equal to the diameter of said coiled spring, said two parts having a longitudinal interface, said clamping member being provided with a continuous helical groove in the outer surface thereof, said helical groove substantially conforming to the configuration and cross-sectional dimensions of said coiled spring and having an indentation at lower end thereof adapted for receiving said internally projecting lug of said helical coiled spring, said clamping member further having an opening therethrough along its axis of dimensions substantially the same but not less than, the dimensions of said shock absorber at the point to which said clamping member is to attach, said clamping member being further provided with means for joining and holding said two sections thereof in fixed relation to one another and to said shock absorber.

In another of its embodiments, a clamping member as above described is employed to secure both of the ends of the external, helical coiled spring to the ends of the shock absorber.

In still another embodiment of the present invention, the present invention comprises a means of affixing the ends of a coiled spring concentrically aligned with a shock absorber, to said shock absorber, said means comprising a clamping member comprised of two segments which when joined are cylindrical and have a diameter approximately equal to the diameter of said coiled spring, and which have a longitudinal interface, said clamping member having a continuous helical groove in the outer surface thereof, said helical groove substantially conforming to the configuration and cross-sectional dimension of said coiled spring, and having an indentation at its lower end, said clamping member having an opening therethrough along its axis of dimensions substantially the same but not less than, the dimensions of said shock absorber at the point to which said clamping member is to attach, said clamping member being provided with means for joining and holding said two sections thereof in fixed relation to one another and to said shock absorber; and an internally projecting lug at the end of said coiled spring to be joined to said clamping member, said internally projecting lug being adapted to insert into the indentation at the lower end of said helical groove of said clamping member.

By means of the present invention, a shock absorber having a coiled spring concentrically aligned therewith is presented which permits ready and simple, yet strong, attachment of the coiled spring to the shock absorber. In addition, by means of the present invention, the tension of the coiled spring with respect to the various positions of the shock absorber may be readily adjusted.

DESCRIPTION OF THE DRAWINGS

FIGS. 2a and 2b of the drawings illustrate an embodiment of the clamping member of the shock absorber of the present invention, FIG. 2a illustrating such clamping member as shown in FIG. 1, and FIG. 2b illustrating the same clamping member rotated 90° from the view depicted in FIG. 2a.

FIG. 3 of the drawings is a side view of another embodiment of the shock absorber of the present invention having a portion of the coiled spring cut away to better illustrate certain features thereof.

FIGS. 4a and 4b of the drawings illustrate an embodiment of the clamping member of the shock absorber of the present invention, FIG. 4a illustrating such clamping member as shown in FIG. 3 and FIG. 4b illustrating the same clamping member rotated 90° from the view depicted in FIG. 4a.

FIG. 5 of the drawings is a side view of still another embodiment of the shock absorber of the present invention having a portion of the coiled spring cut away to better illustrate certain features thereof, this embodiment particularly illustrating the use of the clamping member of the present invention at each end of said coiled spring.

FIGS. 6a and 6b of the drawings illustrate still another embodiment of the clamping member of the shock absorber of the present invention, FIG. 6a illustrating such clamping member as shown as the upper clamping member in FIG. 5 and FIG. 6b illustrating the same clamping member rotated 90° from the view depicted in FIG. 6a.

FIGS. 7a and 7b of the drawings illustrates still another embodiment of the clamping member of the shock absorber of the present invention, FIG. 7a illustrating such clamping member as shown at the lower end of the shock absorbers shown in FIG. 5, and FIG. 7b illustrating the same clamping member rotated 90° from the view depicted in FIG. 7a.

FIG. 8 of the drawings illustrates the coiled spring of the shock absorber of the present invention as viewed from the bottom thereof and particularly illustrating the inwardly indented lug at the lower end thereof.

FIGS. 10a and 10b of the drawings further illustrate the embodiment of the clamping member of the shock absorber of the present invention illustrated by FIG. 9, FIG. 10a illustrating such clamping member in the same position as shown in FIG. 9 and FIG. 10b illustrating the same clamping member rotated 90° from the view depicted in such FIG. 10a.

DESCRIPTION OF THE PREFERRED EMBODIMENTS

Figure 1:
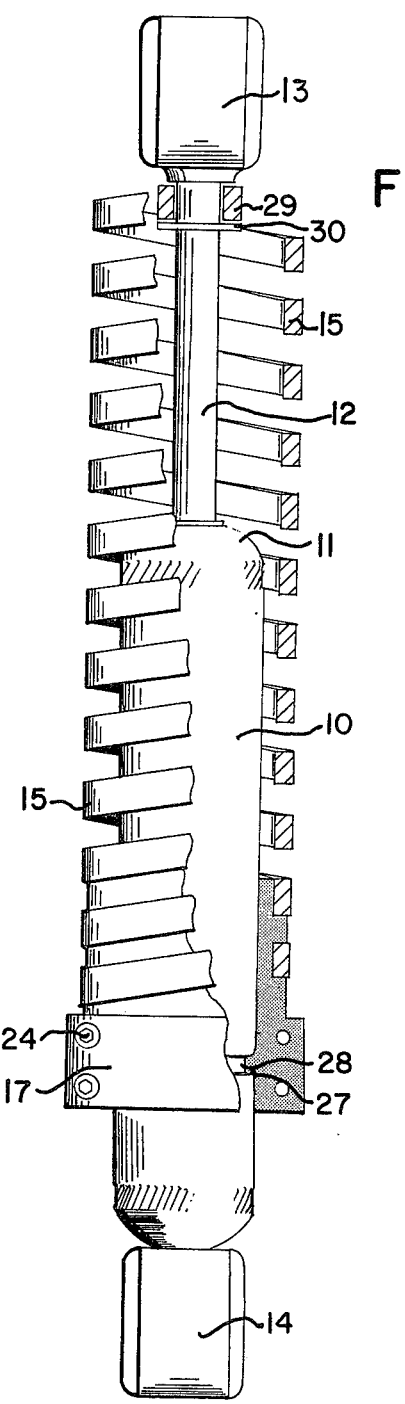
FIG. 1 of the drawings is a side view of a shock absorber of the present invention having a portion of the coiled spring cut away to better illustrate certain features thereof.

In order to further describe the present invention, reference is made to the accompanying drawings. In the drawings, the same reference characters are used throughout to denote like features of the present invention.

Referring to the drawings, a shock absorber of the present invention includes a housing 10 within which moves a plunger in compression upon a fluid or in compression upon a spring, neither of which is shown since they are conventional to shock absorbers and form no part of the present invention. In slidable contact with housing 10 at its upper end 11 is a plunger rod 12 which connects internally of the housing 10 with the plunger disc which is not shown. Plunger rod 12 generally is concentrically aligned with housing 11.

At the upper end of plunger rod 11 is shown an upper attachment means 13 which serves to provides means of attachment of the shock absorber of the present invention to the frame of the vehicle to be supported thereby. Such upper attachment means 13 may be of the saddle mount type shown in FIGS. 1 and 5 or may be a threaded rod as shown in FIG. 3. A threaded rod may either thread into a receiving-clamping means such as a an appropriate nut or other device which affixes the upper end of plunger rod 11 to the vehicle to be supported thereby. Since the means of attachment of plunger rod 11 to the vehicle suspended by the shock absorber of the present invention is not part of this invention and is well within the skill of the art, no further description thereof is deemed necessary.

The lower end of the housing 10 of the shock absorber of the present invention is joined unto a lower attachment means 14. This lower attachment means 14 provides means for attachment of the shock absorber of the present invention to the conveyancing members of the vehicle, i. e., a wheel or axle. While the lower attachment means 14 is shown in the drawings as being of the saddle mount type, this is not to be construed as limiting. It is immaterial to the present invention as to the form of lower attachment means 14, since it merely provides a means of attachment of the shock absorber of the present invention to the conveyancing members of the vehicle and since such means of attachment is well within the ability of those skilled in the art. Further, the form of said lower attachment means 14 will quite frequently be dictated by the type and arrangement of the conveyancing members of the vehicle.

Surrounding the shock absorber housing 10 and plunger rod 11 of the present invention is a helical coiled spring 15. This spring 15 is in concentric alignment with plunger rod 11 and housing 10. The lower end of spring 15 is provided with an internally extending lug 16. (See FIG. 8.) The purpose of this lug 16 will be more fully described hereinafter.

A clamping member 17 is provided for securing the lower end of spring 15 to the housing 10 of the shock absorber of the present invention. This clamping member 17 is provided with helical grooves 18 which generally conform to the helical configuration and the external dimensions of the spring 15. At the lower end of such helical grooves 18 is found an indentation 19 which generally conforms in shape to the internal projection of lug 16 of coiled spring 15.

Figure 2:
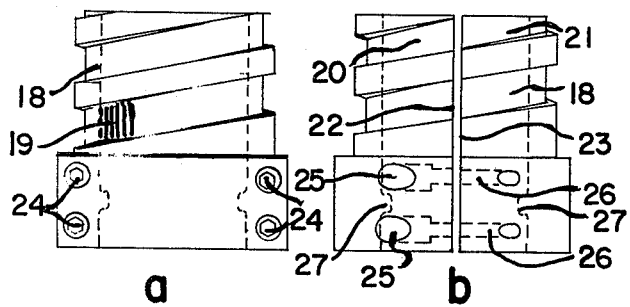

Referring particularly to FIGS. 2b, 4b and 7b of the drawings, it is seen that the lower clamping member 17 is comprised of two segments 20 and 21. In general, these two segments represent halves of said clamping member 17. The joinder of segments 20 and 21 of lower clamping member 17 provides such lower clamping member 17 with a generally cylindrical shape. The joinder of said segments 20 and 21 is along interfaces 22 and 23, respectively, which interfaces run longitudinally or lengthwise with respect to the cylinder formed by joining segments 20 and 21.

The joinder of sections 20 and 21 of clamping member 17 is accomplished by means of clamping screws 24 as shown in FIGS. 1, 2a, 2b, 5, 7a and 7b. In FIGS. 1 and 2a and 2b, four such clamping screws 24 are utilized. However, as shown in FIGS. 5, 7a and 7b, two such clamping screws are employed. Of course, if desired, any number of such clamping screws 24 may be employed. In any event, such clamping screws 24 extend through openings 25 into threaded channels 26 to thereby lock segments 20 and 21 together.

By use of such clamping screws 24, the clamping members 17 of the present invention may be moved to different points along housing 10, thereby permitting adjustment of the tension of spring 15. However, as shown in FIGS. 1, 2a and 2b, the clamping member 17 may be provided with a projecting rim 27 which fits into a groove 28 within the housing 10 of the shock absorber despite the use of clamping screws 24. Of course, when the shock absorber of the present invention employs grooves 28 within housing 10 to cooperate with rims 27 of the clamping member 17, adjustment of the tension of spring 15 is not permitted.

Referring particularly to FIGS. 1 and 3, the upper end of spring 15 is secured to the shock absorber, specifically, to the plunger rod 12 by means of a pigtail section 29. This pigtail section 29 is nothing more than a portion of said spring coiled of lesser diameter of the remainder of the spring, the lesser diameter substantially approximating but being slightly larger than the diameter of the plunger rod 12 of the shock absorber of the present invention. This pigtail 29 may be secured to the plunger rod 11 by any means known to those in the art. It may be welded, encased between the washer 30 (FIGS. 1 and 3) and the upper attachment means 13 or other means, well within the ability of those skilled in the art, which prevents upward movement along plunger rod 12 of pigtail 29. Of course, the item referred to as washer 30 is permanently affixed to plunger rod 12.

When the housing 10 of the shock absorber of the present invention is provided with the groove 28, depending entirely upon the circumstances and desires of the user, it may or may not be desirable to provide clamping member 17 with means for clamping or unclamping together segments 20 and 21 by means of clamping screws 24. When such housing 10 has a groove 28 therein, it may be desirable to provide for segments 20 and 21 of clamping member 17 to be laminated, glued or otherwise joined together without benefit of removable clamping means such as clamping screws 24. In such instance, the joinder of segments 20 and 21 of clamping member 17 is generally of a substantially permanent nature. Means of so permanently joining segments 20 and 21 are well known to the art and require no further definition herein. For specific illustration of such embodiment of the present invention, please note FIGS. 3, 4a and 4b.

While the present invention has been hereinabove described with reference to the use of a pigtail 29 of spring 15 as a means of joinder of the upper end of said spring 15 to the plunger rod 12, other means of joining and affixing spring 15 to such plunger rod 12 may be employed. Referring now particularly to FIGS. 5, 6a, 6b, 9, 10a and 10b, the use of an upper clamping member 31 similar to that hereinabove discussed for affixing the upper end of spring 15 to plunger rod 12 is illustrated. This upper clamping member 31, like the lower clamping member 17, is comprised of two segments 32 and 33 which are joined together along interfaces 34 and 35, respectively. Joinder of segments 32 and 33 form upper clamping member 31 which is also generally cylindrical in shape. The joining of segments 32 and 33 may be by any of the means hereinabove discussed with reference to the joinder of segments 20 and 21.

The upper clamping member 31 is provided with a helical groove 34 which generally conforms to the helical configuration and the dimensions of spring 15. Generally, an indentation 35 is provided at the upper end of helical groove 34. Such indentation 35 conforms in shape and purpose to indentation 19 of clamping member 17.

Referring particularly to FIGS. 5, 6a and 6b, the clamping member 31 has an internal configuration corresponding to the dimensions of gravel shield 36 (FIG. 5). Gravel shield 36 is of the ordinary type, though as shown in FIG. 5, it has been cut off along the lower edge of upper clamping member 31. As shown in FIGS. 5, 6a and 6b, gravel shield 36 is provided adjacent its upper end, with a projecting rim 37. Upper clamping member 31 is provided with an internal groove 38 corresponding to projecting rim 37 in configuration and size. By means of projecting rim 37 and internal groove 38, joinder of segments 32 and 33 provides a non-slip fixed joinder of upper clamping member 31 to gravel shield 36 which is in turn, fixed in normal fashion to plunger rod 12.

Again referring particularly to FIG. 5 and FIGS. 7a and 7b, another modification of the present invention is illustrated. In FIG. 5, housing 10 is illustrated as having a spiral groove 39 in its outer surface. Certain standard shock absorbers are so constructed. To facilitate a fixed, non-slip attachment of lower clamping member 17 to housing 10, the internal surface of such lower clamping member 17 is provided with a helical rim 40 of configuration and size to conform to and intrude into spiral groove 39 of housing 10. By joinder of segments 20 and 21 around housing 10, helical rim 40 is introduced into spiral groove 39, thereby locking lower clamping member 17 against any slipping motion along housing 10.

Figures 9, 10:
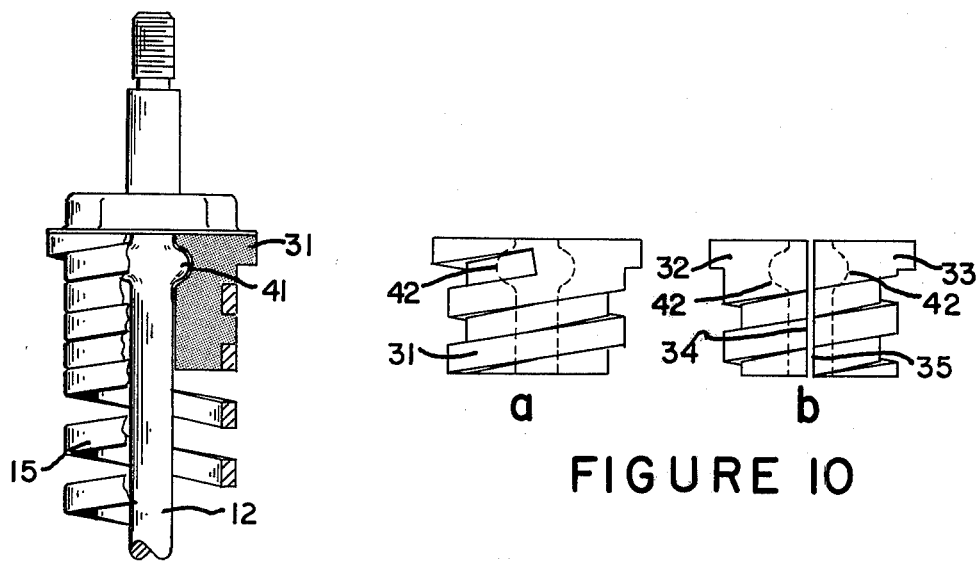
FIG. 9 of the drawings is a side view of an upper end of a shock absorber of the present invention shown in partial cross section and particularly illustrating yet another embodiment of the clamping member of the shock absorber of the present invention.

Referring particularly to FIGS. 9, 10a and 10b, still another modification of the shock absorber of the present invention is illustrated. In FIG. 9, plunger rod 12 is shown as having a circular projecting shoulder 41 adjacent its upper end. The upper clamping member used in conjunction with plunger rod 12 is provided with a circular groove 42 of configuration and size to receive the projecting shoulder 41. Again, by joinder of segments 32 and 33 around plunger rod 12 and projecting shoulder 41, upper clamping member 31 is fixed to plunger rod 12 in a manner which does not permit slipping of upper clamping member 31 along plunger rod 12.

What is claimed is:

1. A shock absorber having an external, helical coiled spring in concentric alignment therewith, one end of said coiled spring being fixed to one end of such shock absorber and the other end of said coiled spring being provided with an internally projecting lug as a part thereof, said other end being secured to said shock absorber by means of a clamping member, said clamping member comprising two sections which when joined, are cylindrical and have a diameter approximately equal to the diameter of said coiled spring, said two parts having a longitudinal interface, said clamping member being provided with a continuous helical groove in the outer surface thereof, said helical groove substantially conforming to the configuration and cross-sectional dimensions of said coiled spring and having an indentation at lower end thereof adapted for receiving said internally projecting lug of said helical coiled spring, said clamping member further having an opening therethrough along its axis of dimensions substantially the same but not less than, the dimensions of said shock absorber at the point to which said clamping member is to attach, said clamping member being further provided with means for joining and holding said two sections thereof in fixed relation to one another and to said shock absorber.

2. The shock absorber of claim 1 wherein both ends of said coiled spring are affixed to said shock absorber by means of said clamping means.

3. The shock absorber of claim 1 wherein said means for joining said sections of said clamping members comprise a plurality of threaded members extending in threaded relationship into at least one of said sections of said clamping member and through the other section of said clamping member.

4. A means of affixing the ends of a coiled spring concentrically aligned with a shock absorber, to said shock absorber, said means comprising a clamping member comprised of two segments which when joined are cylindrical and have a diameter approximately equal to the diameter of said coiled spring, and which have a longitudinal interface, said clamping member having a continuous helical groove in the outer surface thereof, said helical groove substantially conforming to the configuration and cross-sectional dimension of said coiled spring, and having an indentation at its lower end, said clamping member having an opening therethrough along its axis of dimensions substantially the same but not less than, the dimensions of said shock absorber at the point to which said clamping member is to attach, said clamping member being provided with heans for joining and holding said two sections thereof in fixed relation to one another and to said shock absorber; and an internally projecting lug at the end of said coiled spring to be joined to said clamping member, said internally projecting lug being adapted to insert into the indentation at the lower end of said helical groove ofnsaid clamping member.

5. The shock absorber of claim 3 wherein both ends of said coiled spring are affixed to said shock absorber by means of said clamping means.

* * * * *